United States Patent [19]

Srinivasan

[11] Patent Number: 5,185,782
[45] Date of Patent: Feb. 9, 1993

[54] ACD ARRANGEMENT FOR AUTOMATICALLY RETURNING A CALL AT A TIME SPECIFIED BY THE ORIGINAL CALLER

[75] Inventor: Thirunarayanan Srinivasan, Denver, Colo.

[73] Assignee: A&T Bell Laboratories, Murray Hill, N.J.

[21] Appl. No.: 652,811

[22] Filed: Feb. 8, 1991

[51] Int. Cl.$^5$ .............................................. H04N 3/50
[52] U.S. Cl. ........................................ 379/67; 379/88; 379/214; 379/216; 379/266
[58] Field of Search .................. 379/266, 265, 309, 8, 379/214, 67, 216

[56] References Cited

U.S. PATENT DOCUMENTS

| | | | |
|---|---|---|---|
| 4,788,715 | 11/1988 | Lee | 379/84 |
| 4,893,328 | 1/1990 | Peacock | 379/67 |
| 4,896,345 | 1/1990 | Thorne | 379/67 |
| 4,939,771 | 7/1990 | Brown et al. | 379/67 |
| 5,020,095 | 5/1991 | Morganstein et al. | 379/67 |
| 5,036,535 | 7/1991 | Gechter et al. | 379/210 |

OTHER PUBLICATIONS

"Beyond ISDN Theory", Andrew Waite, Inbound-/Outbound Magazine, Dec. 1989, pp. 20–22.
"The Smart Way to Handle Incoming Callers", Keith Dawson, Inbound/Outbound Magazine, May 1990, pp. 22, 24, 27, 28, 30–32, 34.
Rockwell International IQueue TM capability advertisement, 2 pages, source unknown, 1990.
S. Girishankar, "Answering the Call," Communications Week, No. 304, (Jun. 11, 1990) p. 24.
T. Smith, "Rockwell ACD Software Improves Caller Services," Network World, vol. 7, No. 25 (Jun. 18, 1990) pp. 35, 38.
Aspect Call Center Product Specification, (Oct. 13, 1989) p. 37.
D. Matheson, "ISDN: The Technology Has Discovered Its Purpose," Telemarketing, (May, 1990) pp. 44–47.
AT&T News Release, Voice Mark Service, (Jan. 23, 1990).
A. Chu, "A Machine That Listens," Bell Labs News, (Jan. 22, 1991) pp. 1, 4.

Primary Examiner—Thomas W. Brown
Attorney, Agent, or Firm—David Volejnicek

[57] ABSTRACT

An automatic callback arrangement for an automatic call-distribution (ACD) system. The arrangement collects and stores the telephone number from which a call is incoming (ANI), estimates how long the call will have to hold in queue before it is answered, and, if the waiting time exceeds a predetermined maximum, prompts the caller to chosse between holding or receiving a return call if the caller is a valid-account holder. If the caller choses a return call, the arrangement prompts the caller for callback time and time-period. The arrangement then verifies whether the caller is a valid account holder. If so, the arrangement places an outgoing call to the stored telephone number when the callback time arrives. If the call does not get through, the arrangement repeatedly periodically repeats placing of the outgoing call, until the call gets through or the callback time-period expires. When it places the outgoing call, the arrangement connects the originating end thereof to an ACD agent to handle the call.

30 Claims, 8 Drawing Sheets

ACD ARRANGEMENT FOR AUTOMATICALLY RETURNING A CALL AT A TIME SPECIFIED BY THE ORIGINAL CALLER

TECHNICAL FIELD

This invention relates generally to the field of telemarketing services and equipment, and relates specifically to customer features of automatic call-distribution equipment and services.

BACKGROUND OF THE INVENTION

Automatic call-distribution (ACD) systems are well known in the art for providing telemarketing-type services. In such systems, incoming calls concerning some predefined topic (typically a product or a service) are distributed for answering to individual ones of a plurality of agents, or outgoing calls regarding the topic are placed either manually by the plurality of agents or automatically by the ACD system itself. Given a finite number of agents, ACD systems cannot handle an unlimited number of calls. Consequently, during periods of especially-heavy incoming-call volume, some callers are placed on hold to await the availability of ACD agents to handle the calls.

ACD system providers can subscribe to the option of having callers' telephone numbers delivered to them by the telephone company along with the incoming calls. Some ACD systems take advantage of this capability by recording the telephone numbers of incoming calls and offering callers who have been placed on hold the option of either remaining on hold or hanging up and having their calls returned by agents when they become available. Some state-of-the-art ACD systems expand upon this capability even further and allow the callers who have been placed on hold to leave voice messages for agents. These messages are then delivered to the ACD agents, who are charged with returning the calls. The messages either may be retrieved by ACD agents manually by prompting the ACD system, or they may be delivered to ACD agents automatically by the ACD system when it detects that the agents have become available. The return call may even be originated automatically by the ACD system.

Though these arrangements make possible the return of calls that have not been handled by agents, they have a serious shortcoming in that the calls are returned at the ACD systems' convenience as opposed to the original callers'—the customers'—convenience. That is, it is the ACD systems or agents that decide when to return the calls. Returning of the calls is typically done at the first opportunity when some agents become free from answering incoming calls. But this time may not be convenient for the original callers—for example, they may no longer be available to receive the returned calls. This has a number of undesirable economic consequences. Firstly, it wastes agents' time in making unproductive calls. Secondly, from a telecommunications standpoint, it is costly to set up connections end-to-end that do not yield anything of value either to the employers of the ACD service or to the called customers. And thirdly, the customers may not realize that they had been called back, or even if informed thereof may lose patience and not return the calls, resulting in negative customer perceptions in the former case and loss of business opportunities in both cases.

In the case of the ACD systems that allow on-hold callers to leave voice messages, it is possible that callers could specify the times at which they wish to be called back. But many callers may not think of doing so. Even if they do, there is no assurance that agents will receive their messages in time to place the return calls at the desired times. And even if the agents do get the messages in time, there is no assurance that the generally harried agents will be able to keep good enough records or remember to return a myriad of calls at the requested times, or that they will be free of answering incoming calls at the requested times in order to be able to return the calls then.

SUMMARY OF THE INVENTION

This invention is directed to solving these and other disadvantages of the prior art. Broadly according to the invention, an ACD system includes an automatic callback arrangement that automatically returns a caller's call at a time specified by the caller itself. The telephone number to which the return call is placed may be a number that was delivered by the telephone company along with the incoming call, or may be a number explicitly supplied by the caller.

In preferred embodiments of the invention, the operation of the automatic callback capability may be invoked for a particular call upon a determination made by the system that an agent will not be available to answer the call within a predetermined time. As part of that operation, the system may afford the caller the option of either receiving the callback or holding until an agent becomes available.

Also in preferred embodiments, the caller may specify a callback time period during which the caller expects to be able to receive the return call, and the system will periodically attempt to return the call throughout the period.

In accordance with a feature of the invention, the system may be arranged to make the return call only if the caller is within a predetermined class of callers, such as being the holder of a valid account with the company in question.

The invention eliminates the disadvantages of the prior art. It allows callers to specify when their calls will be returned, thereby ensuring that calls are returned at the original callers' convenience and thus ensuring greater likelihood of availability of the original callers to receive the return calls. The likelihood of unsuccessful attempts to return calls is drastically reduced, and so agents' time and telecommunication resources are conserved, positive customer relations are maintained, and business opportunities are maximized. Yet all this is achieved without placing additional undue burdens on the agents charged with returning calls. They are relieved of having to monitor callers' messages frequently and of having to keep track of callers' callback requests, in order to make sure that calls are returned on time. They are also relieved of having to place the calls. Nor do they have to worry about being prevented from returning calls on time on account of having to handle incoming calls.

These and other advantages and features of the invention will become apparent from the following description of an illustrative embodiment of the invention taken together with the drawing.

DETAILED DESCRIPTION

Figure 1:
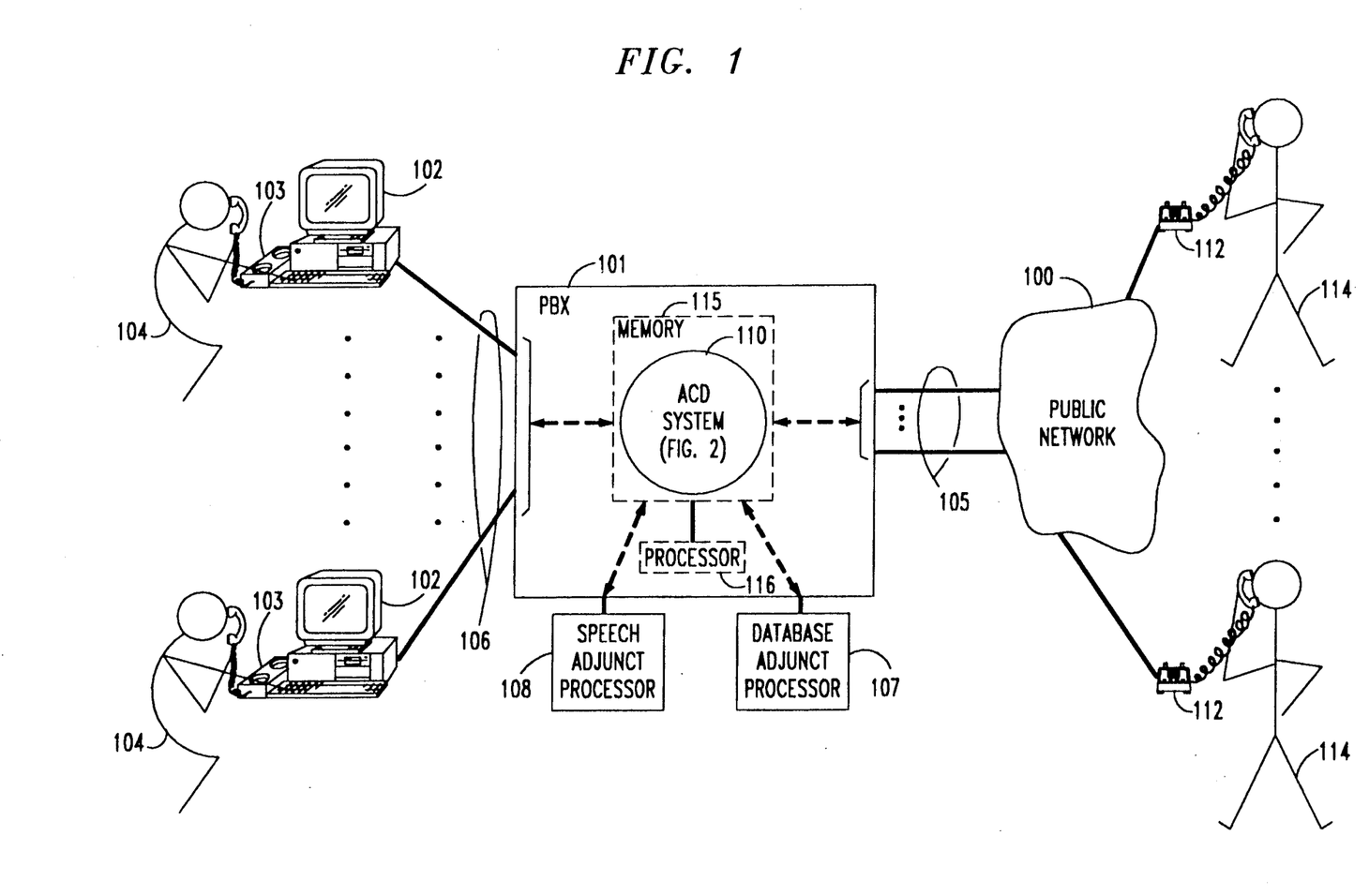
FIG. 1 is a block diagram of an illustrative ACD configuration.

FIG. 1 shows an illustrative ACD configuration. The configuration is centered on a private-branch exchange (PBX) 101 that includes an automatic call-distribution (ACD) system 110. Illustratively, PBX 101 is the AT&T System 75 or 85, and ACD system 110 is the AT&T ACD software stored in memory 115 of PBX 101 and executed therefrom by processor 116 of PBX 101 to perform the functions described below. Alternatively, ACD system 110 may be an ACD adjunct processor, such as the one made by Digital Transmission Incorporated. In either case, ACD system 110 is modified in the manner shown in FIG. 2 to provide the functionality of this invention.

For receiving incoming calls and placing outgoing calls, PBX 101—and therethrough also ACD system 110—are connected by a plurality of communication links—telephony trunks 105 in this instance—to the public telephone network 100 which serves persons who are telephone users 114, and their telephones 112. Trunks 105 may be, for example, either the traditional multifrequency (MF) signaling analog trunks, or the ISDN digital trunks. To receive the incoming calls and to place the outgoing calls, a plurality of call-handling stations, referred to as ACD agent positions 102, are connected to PBX 101 by telephony lines 106 and are interfaced to trunks 105 by PBX 101 and ACD system 110. Each position 102 is served by an agent 104, and includes a voice terminal 103, such as a multi-function telephone set, for the agent's use in answering and placing calls. In many applications, each agent position 102 also includes a data terminal for displaying data information associated with the calls. Each agent position 102 is illustratively the AT&T display management system (DMS). Finally, two adjunct processors 107 and 108 are connected to PBX 101. They supplement the functionality of PBX 101 and ACD system 110 in a manner described below.

Figure 2:
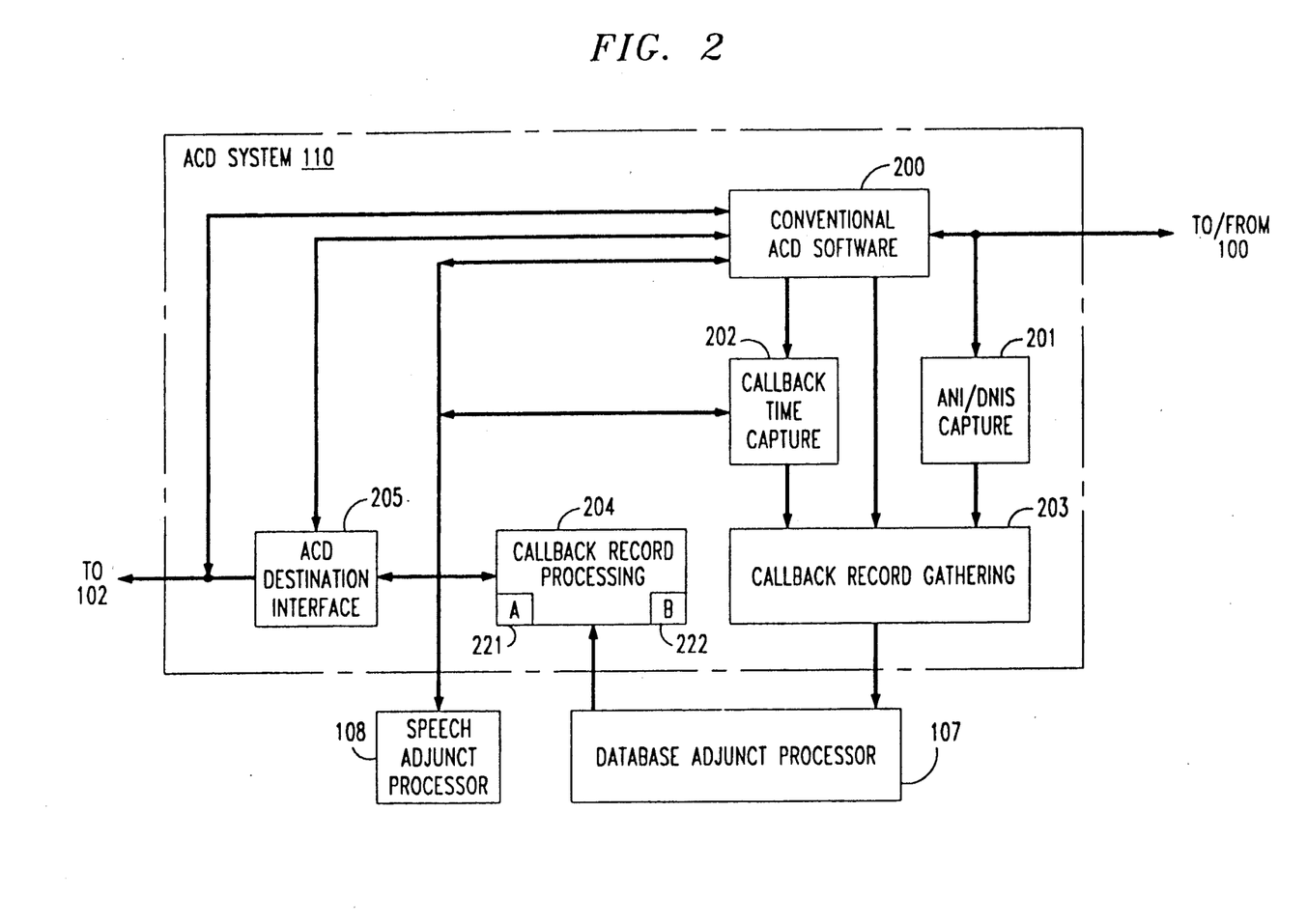
FIG. 2 is a block diagram of the ACD system of the ACD configuration of FIG. 1 including an illustrative embodiment of the invention.

Turning to FIG. 2, ACD system 110 includes conventional ACD software 200 (such as the AT&T ACD software referred to above) supplemented by additional software modules 201-205 which serve to implement the functionality of this invention. ACD software 200 is logically connected—through call-processing software, registers, and other conventional elements of PBX 101—to trunks 105 and lines 106. Also logically connected to trunks 105 is ANI/DNIS capture module 201. The function of module 201 is to capture Automatic Number Identification (ANI) information—the calling number—and Dialed Number Identification Service (DNIS) information—the called number—that is supplied by network 100 to PBX 101 as part of the set-up of incoming calls from users 114. Logically connected with conventional ACD software 200 is callback time-capture module 202. ACD software 200 hands off to module 202 those incoming calls whose originators 114 have indicated a desire to be called back instead of remaining on hold. Module 202 prompts for, and with the assistance of speech adjunct processor 108 captures, caller 114 input on callback time and callback time-period duration. Logically connected to modules 201 and 202 is a callback record-gathering module 203. Module 203 gathers information pertaining to an incoming call that has been collected by modules 201 and 202 into a call record, which it forwards to database adjunct processor 107.

Processor 107 performs database lookup and comparison functions for the forwarded call record, and forwards records that result in favorable comparisons to callback record processing module 204. Function 204 keeps callback records and schedules return calls. Module 204 is logically connected to ACD destination interface module 205, which places the return calls when prompted by module 204, and connects the placed calls to ACD agents 104 for handling. For this purpose, module 205 is logically connected to telephone lines 106. Once a return call has been established, module 205 hands off control thereof to conventional ACD software 200, via a logical connection between them.

The functions performed by ACD system 110 in providing callback services to incoming calls are illustrated in the flowcharts of FIGS. 3-8. These functions are initiated at set-up of an incoming call from a caller 114, at step 300 of FIG. 3. As part of the messaging involved in the call set-up, network 100 provides to PBX 101 the ANI and DNIS information. This information is captured by module 201, at step 301. Module 201 associates with this information a call I.D. that will have been assigned to the call by PBX 101 software, at step 302, and hands off the information and call I.D. to module 203.

Figure 3:
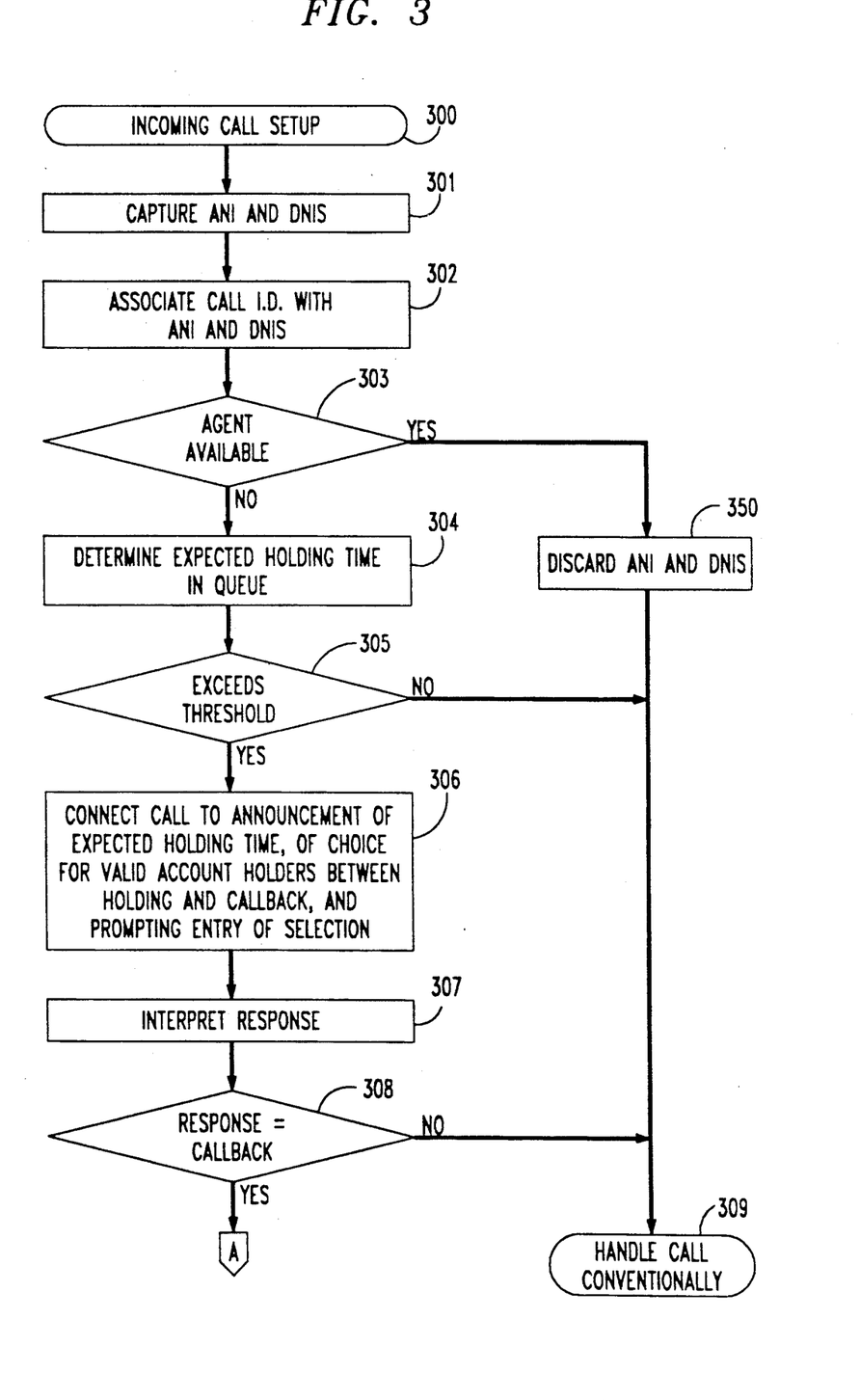
FIGS. 3-5 are a flowchart of the functions of the ANI/DNIS capture, callback time capture, and callback record-gathering modules of the ACD system, and of the database processor, of FIG. 2.

Following call set-up, ACD software 200 determines whether an agent 104 is free to answer and handle the incoming call immediately, or if the call must be placed in queue to await the freeing up of an agent 104, at step 303. If an agent 104 is available, the call is handled conventionally by ACD software 200, at step 309. ACD software 200 informs module 203, which discards the ANI and DNIS which it had received for that call, at step 350. If no agent 104 is available, ACD software 200 determines the expected holding time in queue of this call before it will be answered by an agent 104, at step 304. ACD software 200 may use any one of a number of known techniques to accomplish this. ACD software 200 then checks whether this expected holding time exceeds a predetermined maximum time, at step 305. Alternatively, ACD software 200 may dispense with step 304 and merely check at step 305 whether the number of incoming calls presently waiting in queue exceeds a predetermined maximum. If so, the holding time is likely to exceed the predetermined maximum. If the threshold time or number is not found to be exceeded at step 305, ACD software 200 handles the call conventionally, at step 309. If the threshold value is found to be exceeded at step 305, ACD software 200 connects the call to an announcement of the expected holding time (or, in the alternative, of the number of other calls in queue) and of the choice, given to all valid-account holders (as is made clear further below), between holding and callback, at step 306. Alternatively, the choice may be given not only to valid-account holders, but to all callers. At step 306, the announcement also prompts the caller 114 to enter a selection of either hold or callback. The caller 114 may be given a choice of any one of a number of methods to make a selection. For example, the caller 114 may be asked to press one predetermined Touch Tone key on his or her telephone 112 to signal one selection and another predetermined Touch Tone key to signal the other selection; pressing no key or any other key may be treated as a default equivalent to selecting hold. Or, the caller 114 may be asked to voice—to speak—the selection into the telephone. When PBX 101 detects the caller's response, ACD software 200 takes steps to interpret it, i.e., to determine what it is, at step 307. Touch tone recognition circuitry is commonly included in PBX 101; voice recognition requires the use of a speech adjunct processor 108, such as the AT&T Conversant ® Voice Information System, which may be either a unit separate from PBX 101 or a circuit pack incorporated into PBX 101.

Figure 4:
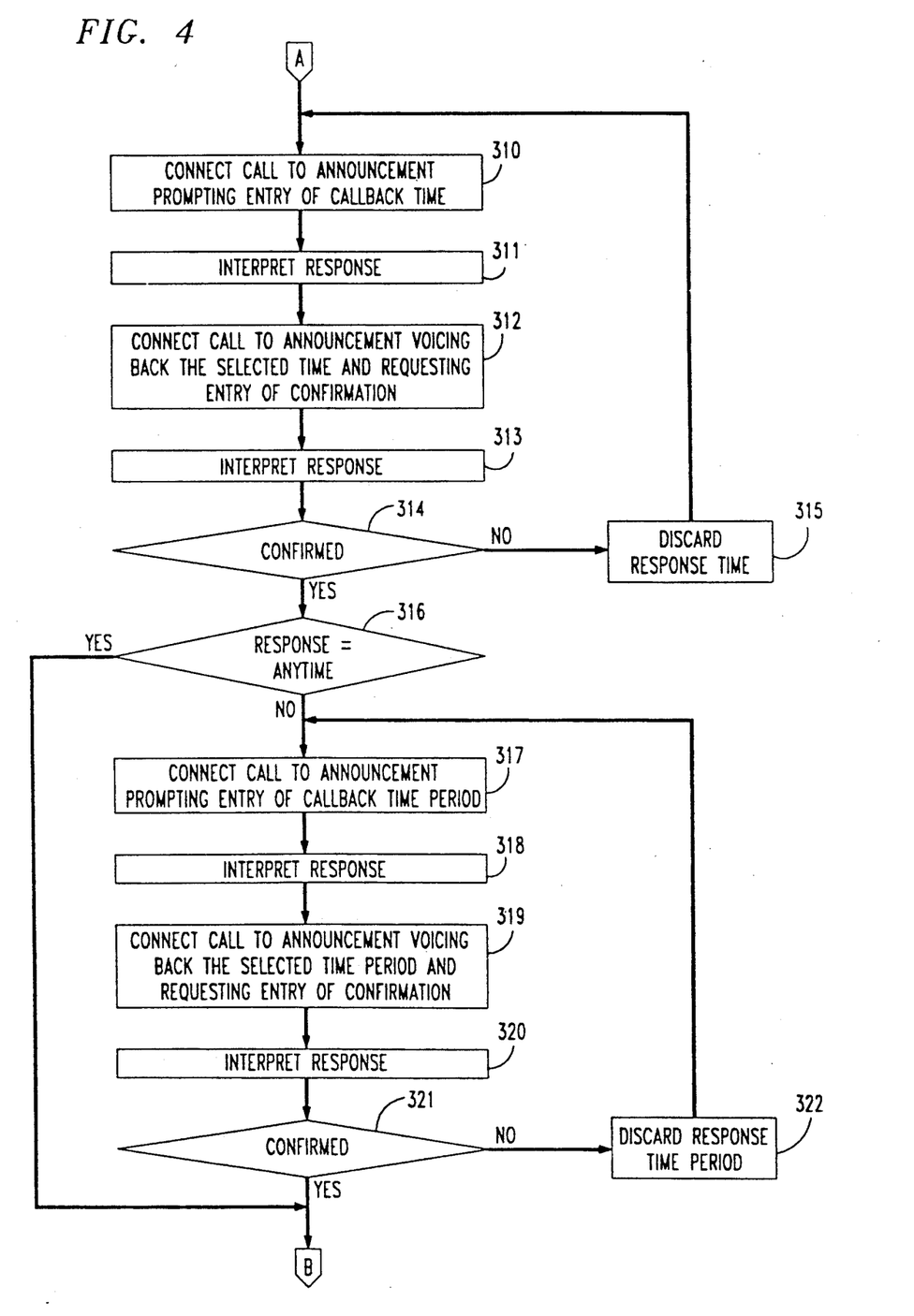

Having interpreted the caller's response, ACD software 200 checks whether the choice is callback, at step 308. If not, ACD software 200 proceeds to step 309 to handle the call conventionally; if so, the call is handed off to module 202. Module 202 connects the call to an announcement that prompts the caller 114 to enter the time at which he or she would like to be called back, at step 310. One of the choices given to the caller 114 is to have the call returned at any time, e.g., as soon as possible. Module 202 then awaits and interprets the received response, at step 311. As in step 307, the response may take any one of a number of forms; a spoken response will require the use of speech adjunct processor 108 for its interpretation. To make sure that the response is correct and correctly interpreted, module 202 connects the call to an announcement that voices the selected time back to the caller 114 and requests entry of a confirmation, at step 312. Module 202 then awaits and interprets the received response, at step 313, and checks whether the response is a confirmation, at step 314. If it is not a confirmation, module 202 discards the previously-received callback time, at step 315, and returns to step 310 to again obtain callback time from the caller 114. If it is a confirmation, module 202 checks whether the caller's choice was to be called at any time, at step 316. If so, module 202 proceeds to step 323; if not, module 202 connects the call to an announcement that prompts the caller 114 to enter the period of time, beginning at the callback time, for which the caller 114 will be available to receive the return call, at step 317. Module 202 then awaits and interprets the received response as at step 311, at step 318. To make sure that the response is correct and correctly interpreted, module 202 connects the call to an announcement that voices the indicated callback time-period back to the caller 114 and requests entry of a confirmation, at step 319. Module 202 then awaits and interprets the received response, at step 320, and checks whether the response is a confirmation, at step 321. If it is not a confirmation, module 200 discards the received callback time-period, at step 322, and returns to step 317 to again obtain a callback time-period from the caller 114. If it is a confirmation, module 200 connects the call to a concluding announcement, at step 323. This announcement, for example, thanks the caller 114 for calling and informs the caller 114 that the call will now be terminated. Alternatively, prior to concluding the call, module 202 may prompt the caller 114 for, and collect, an account I.D., for use in determining whether the caller 114 has a valid account number. Module 202 then causes PBX 101 to disconnect the call, at step 324. Module 202 associates the call I.D. that has been assigned to the call by PBX 101 with the captured callback time and time period, at step 324, and then hands off the gathered information accompanied by the call I.D. to module 203.

Figure 5:
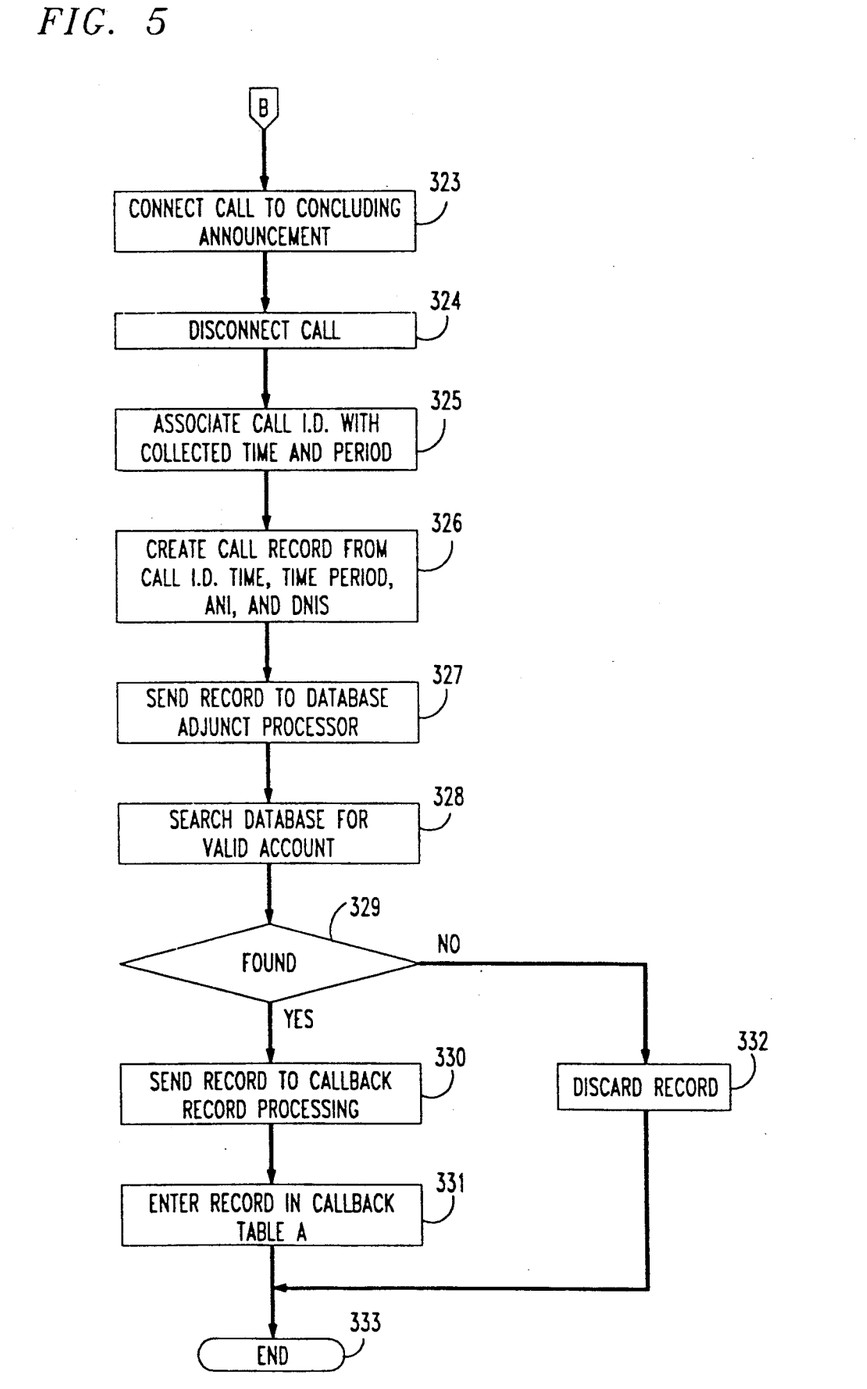

Module 203 has been holding the ANI and DNIS information supplied by module 201 at step 303. Module 203 combines this information with the callback time and duration information just received from module 202 to create a call record, at step 326, and sends the call record to database adjunct processor 107, at step 327. Processor 107 has a database of information on customer accounts. Processor 107 uses the information supplied in the call record to search through the database to determine if the caller 114 is a valid-account holder, at step 328. Illustratively, processor 107 uses the ANI information and searches the database for a valid account having the same phone number. Alternatively, if module 202 had collected from the caller 114 an account number, that number will have been included in the call record, and processor 107 uses the supplied account number to search the database for a valid account having that same account number.

If processor 107 finds a step 329 that the caller 114 is not a valid-account holder, it discards the caller's call record, at step 332. The caller will not be called back, and system activity with respect to that caller's call ends, at step 333. If processor 107 finds at step 329 that the caller is a valid-account holder, it sends the caller's call record back to ACD system 110 to module 204, at step 330. Module 204 receives the record and enters it into a table of callback requests, at 331. Processing of that caller's callback request then temporarily ends, at step 333, until the callback time occurs.

Alternatively, if ACD system 110 honors callback requests of all callers and not just of valid-account holders, processor 107 and steps 327–330 and 332 may be eliminated, and module 203 may hand off the call record that it has created at step 326 directly to module 204 for entry into the callback table at step 331.

Module 204 acts as a callback scheduler. It maintains two callback request tables: A table 221 and B table 222 (see FIG. 2). Upon initially being sent to module 204, all call records are entered in A table 221, at step 331. Callbacks scheduled by module 204 are attempted and performed by module 205. Some callbacks are attempted once and the corresponding call records are discarded; other callbacks are reattempted if they fail. This is made clear in the discussion below. B table 222 stores the records for callbacks that failed but are to be reattempted by module 205. The activities of modules 204 and 205 are flowcharted in FIGS. 6–89.

Figure 6:
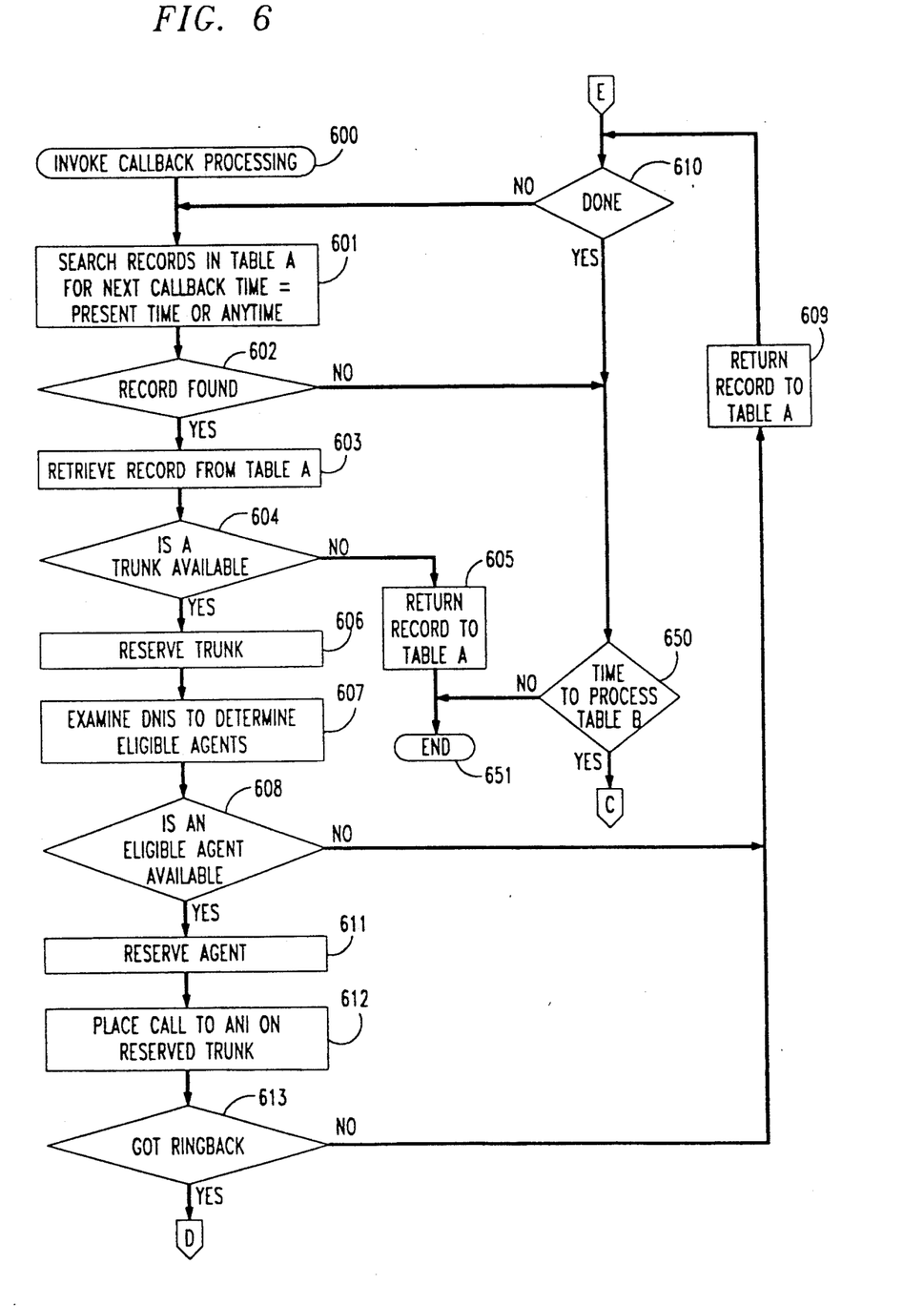
FIGS. 6-8 are a flowchart of the functions of the callback record processing and ACD destination interface modules of the ACD system of FIG. 2.

The scheduling function of module 204 is timer driven: periodically, such as every 30 seconds or one minute, module 204 is invoked, at step 600, and it searches the contents of A table 221 for call records whose callback time entry indicates either any time or the present time, at step 601. If such a call record is not found in A table 221, as determined at step 602, module 204 determines whether it is time to process the call records in B table 222, at step 650. Illustratively, module 204 processes B table 222 every five minutes or so. If it is not time to process B table 222, module 204 ends it activities, at step 351, until such time as it is again invoked at step 600.

Returning to step 602, when a call record which indicates that the time for callback has come is found in A table 221, module 204 retrieves the found call record from A table 221, at step 603, and hands it off to module 205. Module 205 determines, from information kept by PBX 101, whether a trunk 105 is available for placing of an outgoing call, at step 604. If not, module 205 returns the found call record to module 204 and module 204 returns it to A table 221, at step 605. Since no trunks 105 are available for callbacks, modules 204 and 205 end their activities, at step 651, until module 204 is again invoked at step 600.

If an available trunk 105 is found at step 604, module 205 reserves it with ACD softward 200, at step 606, and then examines the DNIS contained in the found call record to determine which agents 104 (i.e., which agent "split") are eligible to handle the return call, at step 607. Module 205 then determines, from information kept by PBX 101, whether any of the eligible agents 104 are available for handling the return call, at step 608. If not, module 205 returns the found call record to module 204 and module 204 returns it to A table 221, at step 609. Then, if the work of module 204 with respect to A table 221 is done, as determined at step 610 (i.e., all of A table 221 has been searched at step 601), module 204 proceeds to step 650. But if work of module 204 with respect to A table 221 is not done, as determined at step 610, module 204 returns to step 601 to continue searching A table 221.

Figure 7:
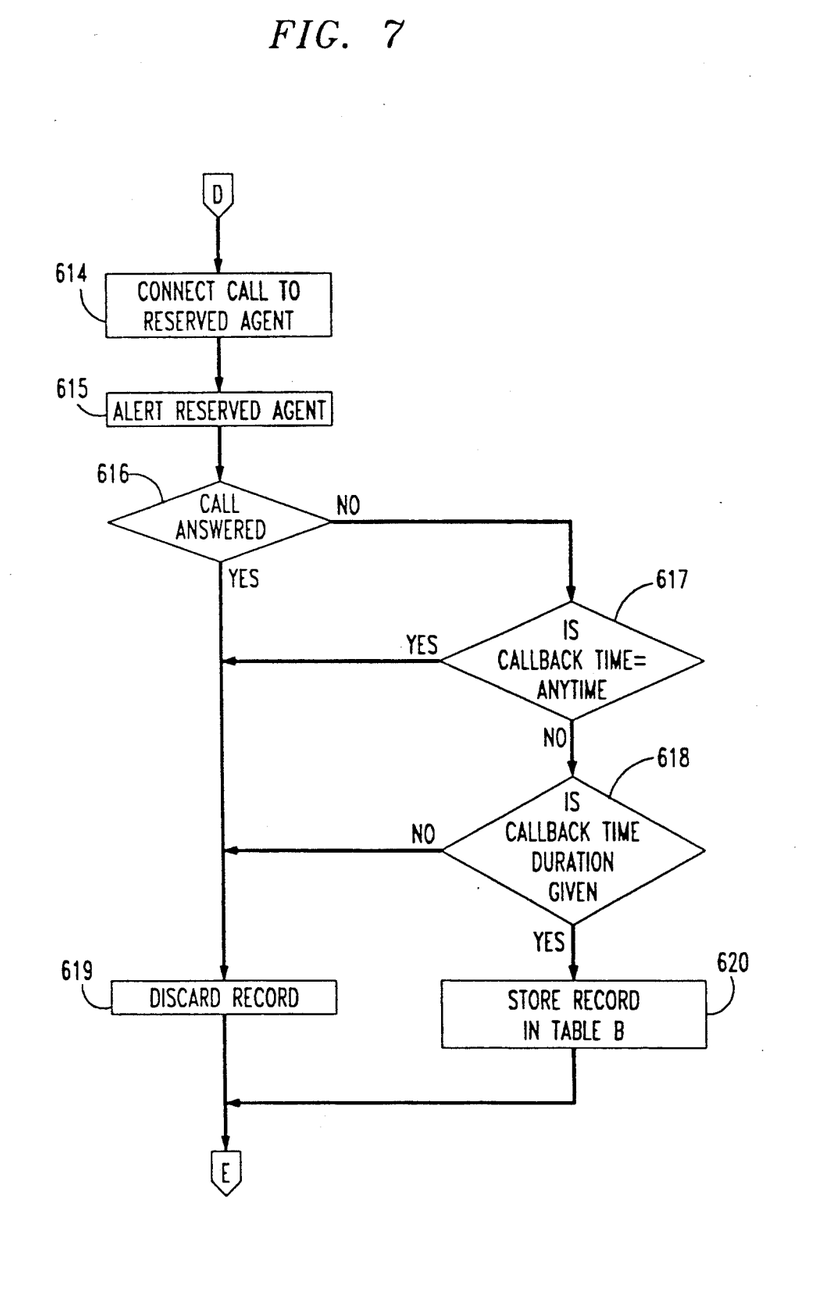

Returning to consideration of step 608, if an eligible agent 104 is available to handle the return call, module 205 reserves the eligible agent 104 with ACD software 200, at step 611. Module 205 then places an outgoing call on the reserved trunk 105 to the telephone number specified by the ANI information in the found call record, at step 612. Module 205 dials the call in the same way as would be conventional auto-dialer. Module 205 then waits for some predetermined time period to receive ringback from network 100, at step 613. If ringback is not promptly received, indicating that the return call did not reach the original caller's telephone 112, module 205 returns the found call record to module 204 and module 204 returns it to A table 221, at step 609. Activity then proceeds to step 610.

Each call has an originating end and a terminating end. The originating end is where the call was made from, i.e., where the call originated. The terminating end is where the call is made to, i.e., where the call terminates. If prompt ringback is received at step 613, module 205 causes PBX 101 to connect the originating end of the call to the reserved agent 104, at step 614, and causes the reserved agent 104 to be alerted at the agent's position 102 by a distinctive ringback tone, at step 615. Module 205 then monitors the call for some predetermined time period, waiting for the call to be answered at its terminating end at the original caller's telephone 112, at step 616. If the call is promptly answered, the callback is successfully completed, and module 205 discards the call record that corresponds to this return call, at step 617. Activity then proceeds to step 610. If the call is not promptly answered, module 205 checks whether the callback-time entry of the corresponding call record indicates that the call may be returned at any time, at step 617. If so, module 205 discards that call record, at step 619, and activity then proceeds to step 610; if not, module 205 checks whether the callback time-period entry of that call record fails to specify a time period, at step 618. If so, module 205 discards that call record, at step 619, and activity then proceeds to step 610; if not, module 205 returns that call record to module 204 and module 204 stores it in B table 222, at step 620. After step 620, activity also proceeds to step 610.

Figure 8:
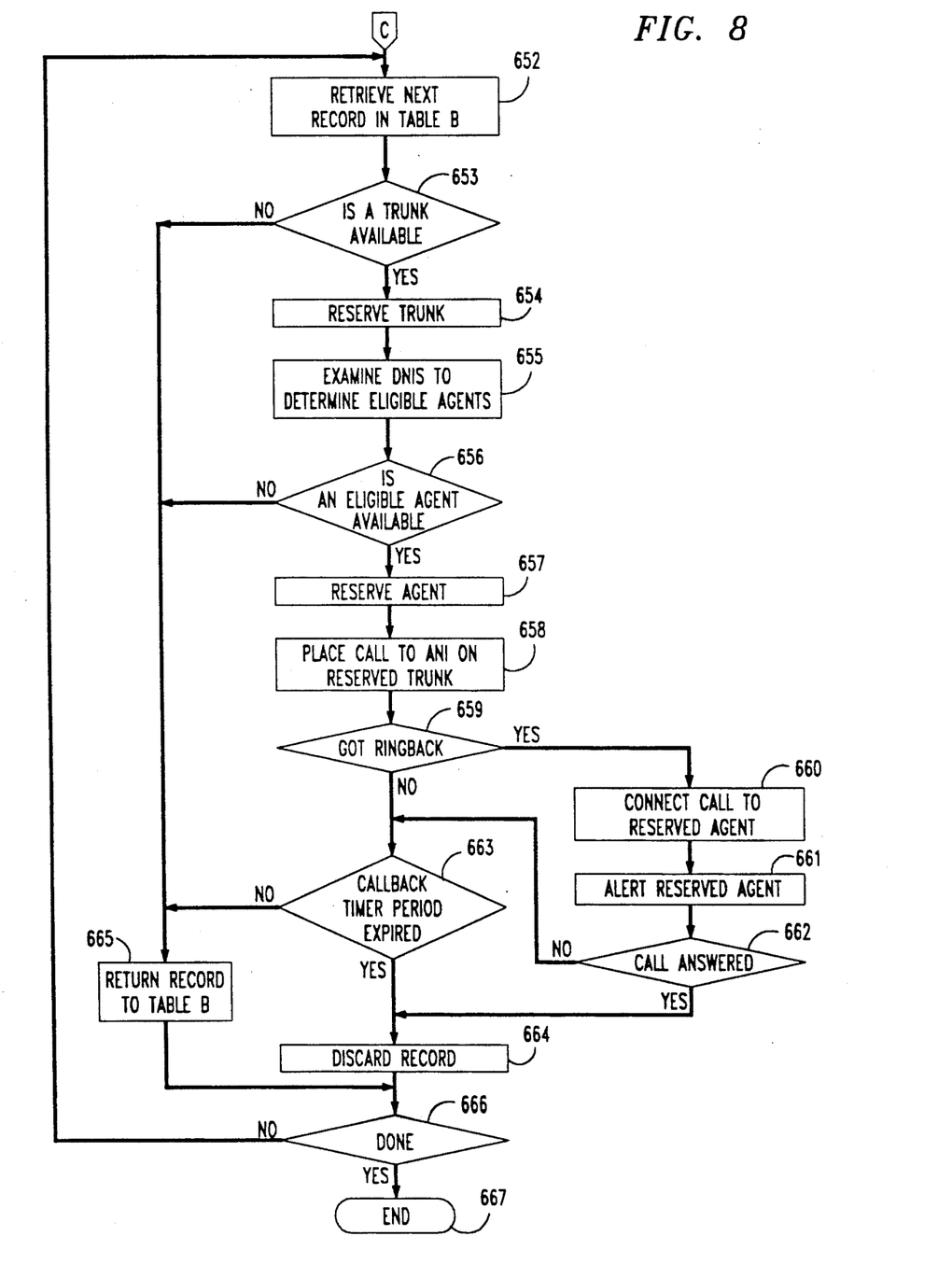

Returning to considersation of step 650, if, following the processing of A table 221, it is determined that the time has arrived to process B table 222, module 204 selects the next—initially the first—call record in B table 222 and hands it off to module 205, at step 652. Module 205 responds by checking whether a trunk 105 for an outgoing call is available, at step 653. If not, module 205 returns the call record to module 204 and module 204 returns it to B table 222, at step 665. If a trunk 105 is available, module 205 reserves it, at step 654, and then examines the DNIS contained in the selected call record to determine which agents 104 are eligible to handle the return call, at step 656. Module 205 then checks whether any of the eligible agents 104 are available for handling the return call, at step 657. If none are available, module 205 returns the call record to module 204 and module 204 returns it to B table 222, at step 665. If an eligible agent 104 is available, module 205 reserves the available agent, at step 657, and then places an outgoing call on the reserved trunk 105 to the telephone number specified by the ANI information in the selected call record, at step 658. Module 205 then waits for prompt receipt of ringback, at step 659. If ringback is not promptly received, indicating that the attempt at callback has not been successful, module 205 checks the callback time and time period entries of the selected call record to determine whether the callback time period has expired, at step 663. If the callback time period has expired, module 205 discards the selected call record, at step 664. If the callback time period has not expired, module 205 returns the call record to module 204 and module 204 returns it to B table 222, at step 665. Following steps 664 or 665, if the work of module 204 with respect to B table 222 is not done (i.e., all of the call records in B table 221 have not been gone through at step 652), as determined at step 666, module 204 proceeds to step 652. But if the work of module 204 with respect to B table 222 is done, as determined to step 666, modules 204 and 205 end their activities, at step 667, until module 204 is again invoked at step 600.

Returning to a consideration of step 659, if ringback on the outgoing call is promptly received, indicating that the return call has reached the original caller's telephone 112, module 205 causes PBX 101 to connect the originating end of the call to the reserved agent 104, at step 660, and causes the reserved agent 104 to be alerted at the agent's position 102 by a distinctive ringback tone, at step 661. Module 205 then monitors the call for some predetermined time-period, waiting for the call to be answered at its terminating end at the original caller's telephone 112, at step 662. If the call is promptly answered, the callback is successfully completed, and module 205 proceeds to step 664 to discard the corresponding call record. If the call is not promptly answered, module 205 proceeds to step 663 to determine whether the callback time period has expired. At and from steps 663 and 664, activities proceed in the manner described previously.

It is emphasized that the activities of the ACD configuration that are shown in FIGS. 3-8 take place automatically, i.e., by action of machine and without human intervention, except for the activities that are explicitly ascribed to either callers or ACD agents.

Of course, it should be understood that various changes and modifications to the illustrative embodiment described above will be apparent to those skilled in the art. For example, in systems where ANI information is not supplied by the network, the functionality of the callback time-capture module may be extended to automatically prompt the caller for, and to automatically save, a telephone number specified by the caller at which the caller wishes to receive the return call. This functionality would illustratively be included in blocks 310–315 and 326 of FIGS. 4 and 5. Or, in some circumstances, the arrangement need not connect a return call to an agent (the originally-called party) until the call has been connected to, i.e., answered by, the originally-calling party, thereby totally eliminating the waste of agents' time that is involved in attempting unsuccessful return calls. Such changes and modifications can be made without departing from the spirit and the scope of the invention and without diminishing its attendent advantages. It is therefore intended that all such changes and modifications be covered by the following claims.

I claim:

1. In an arrangement for automatically distributing incoming calls to a plurality of agents for answering and handling the incoming calls, the improvement comprising:

means responsive to an incoming call from a caller, for storing a telephone number relating to the incoming call;

means operative in response to unavailability of an agent of the plurality of agents to answer the incoming call, for automatically prompting the caller to indicate a callback time;

means responsive to receipt from the caller of an indication of the callback time, for automatically placing an outgoing call having an originating end and a terminating end to the stored telephone number at the callback time; and means responsive to the placing of the outgoing call, for automatically connecting the originating end of the outgoing call to an agent of the plurality of agents to handle the outgoing call.

2. The improvement of claim 1 wherein
the prompting means comprise
means operative in response to unavailability of an agent of the plurality of agents to answer the incoming call, for automatically prompting the caller to indicate a telephone number for callback; and
the storing means comprise
means responsive to receipt from the caller of the telephone number for callback, for automatically storing the received telephone number.

3. The improvement of claim 1 wherein
the storing means comprise:
means responsive to set-up of the incoming call, for automatically storing the telephone number from which the call originated.

4. The improvement of claim 1 further comprising
first means for estimating a waiting time of an incoming call to be answered by an agent; and wherein
the prompting means comprise
second means responsive to unavailability of an agent to answer the incoming call and an estimation by the estimating means that the call's waiting time will exceed a predetermined maximum, for automatically prompting the caller to indicate the callback time.

5. The improvement of claim 4 wherein
the first means include means responsive to the unavailability of an agent to answer the incoming call and the estimation by the estimating means that the call's waiting time will exceed the predetermined maximum, for automatically prompting the caller to indicate whether the caller wishes to hold or to receive a return call; and
the second means include
means responsive to receipt from the caller of an indication that the caller wishes to receive a return call, for automatically prompting the caller to indicate the callback time.

6. The improvement of claim 1 wherein
the prompting means include
means for automatically prompting the caller to indicate a callback time period; and
the call-placing means include
means responsive to the outgoing call failing to be answered at its terminating end, for periodically automatically placing the outgoing call again during the indicated callback time period, until either the outgoing call is answered at its terminating end or the callback time period expires.

7. The improvement of claim 1 further comprising
means for determining whether the caller is a member of a predetermined subset of all possible callers; and wherein
the call-placing means include
means responsive to both the receipt of the indication of the callback time and a determination by the determining means that the caller is a member of the subset, for automatically placing the outgoing call, and responsive to both the receipt of the indication of the callback time and a determination by the determining means that the caller is not a member of the subset, for discarding the received indication without placing the outgoing call.

8. The improvement of claim 1 wherein
the call-placing means include:
means responsive to receipt from the caller of the indication of the callback time, for automatically storing the callback time with the telephone number of the incoming call to schedule a return call to the telephone number at the callback time; and
means responsive to the callback time becoming a present time, for automatically retrieving the stored telephone number and automatically placing the return call to the retrieved telephone number.

9. The improvement of claim 1 wherein
the call-placing means comprise
means responsive to arrival of the callback time, for automatically determining whether an agent is available to handle a return call to the stored telephone number and whether a communication link is available to carry the return call,
means responsive to a determination that an agent and a communication link are available, for automatically reserving an available agent and an available link, and
means responsive to reservation of an agent and a link, for automatically placing the outgoing call on the reserved link to the stored telephone number; and
the connecting means comprise
means responsive to the placing of the outgoing call, for automatically connecting the originating end of the outgoing call to the reserved agent.

10. In an arrangement for automatically distributing incoming calls to a plurality of agents for answering and handling the incoming calls, the improvement comprising:

means for estimating a waiting time of an incoming call to be answered by an agent;

means responsive to an incoming call from a caller, for storing a telephone number relating to the incoming call;

means operative is response to unavailability of an agent to answer the incoming call and an estimation by the estimating means that the call's waiting time will exceed a predetermined maximum, for automatically prompting the caller to indicate whether the caller wishes to hold or to receive a return call;

means responsive to receipt from the caller of an indication that the caller wishes to receive a return call, for automatically prompting the caller to indicate a callback time and a callback time period;

means responsive to receipt from the caller of an indication of the callback time and the callback time period, for automatically placing an outgoing call having an originating end and a terminating end to the stored telephone number at the indicated callback time;

means responsive to the outgoing call failing to be answered at its terminating end, for periodically automatically placing the outgoing call again during the indicated callback time period, until either the outgoing call is answered at its terminating end or the indicated callback time period expires; and means responsive to the placing of the outgoing call, for automatically connecting the originating end of the outgoing call to an agent to handle the outgoing call.

11. The improvement of claim 10 wherein
the prompting means comprise
means operative in response to unavailability of an agent of the plurality of agents to answer the incoming call, for automatically prompting the caller to indicate a telephone number for callback; and
the storing means comprise
means responsive to receipt from the caller of the telephone number for callback, for automatically storing the received telephone number.

12. The improvement of claim 10 wherein
the storing means comprise:
means responsive to set-up of the incoming call, for automatically storing the telephone number from which the call originated.

13. The improvement of claim 10 further comprising
means for determining whether the caller is a member of a predetermined subset of all possible callers; and wherein
the call-placing means include
means responsive to both the receipt of the indication of the callback time and a determination by the determining means that the caller is a member of the subset, for automatically placing the outgoing call, and responsive to both the receipt of the indication of the callback time and a determination by the determining means that the caller is not a member of the subset, for discarding the received indication without placing the outgoing call.

14. The improvement of claim 10 wherein
the call-placing means comprise
means responsive to arrival of the callback time, for automatically determining whether an agent is available to handle a return call to the stored telephone number and whether a communication link is available to carry the return call, means responsive to a determination that an agent and a communication like are available, for automatically reserving an available agent and an available link, and means responsive to reservation of an agent and a link, for automatically placing the outgoing call on the reserved link to the stored telephone number; and the connecting means comprise means responsive to the placing of the outgoing call, for automatically connecting the originating end of the outgoing call to the reserve agent.

15. An arrangement comprising:
means for automatically distributing incoming calls to a plurality of agents for answering and handling the incoming calls;

means responsive to an incoming call from a caller, for storing a telephone number of the incoming call;

means operative in response to unavailability of an agent of the plurality of agents to answer the incoming call, for automatically prompting the caller to indicate a callback time;

means responsive to receipt from the caller of an indication of the callback time, for automatically placing an outgoing call having an originating end and a terminating end to the stored telephone number at the callback time; and means responsive to the placing of the outgoing call, for automatically connecting the originating end of the outgoing call to an agent of the plurality of agents to handle the outgoing call.

16. An apparatus comprising:
a plurality of call-handling stations for use by agents in answering and handling telephone calls connected to the stations;

a switching system connecting the stations to a telephone network;

an automatic call-distribution system cooperative with the switching system for automatically distributing incoming calls to the stations for answering and handling of the incoming calls by the agents;

means responsive to a call from a caller incoming to the automatic call-distribution system, for storing a telephone number of the incoming call;

means operative in response to unavailability of an agent at the plurality of stations to answer the incoming call, for automatically prompting the caller to indicate a callback time;

means responsive to receipt from the caller of an indication of the callback time, for automatically placing through the switching system an outgoing call having an originating end and a terminating end to the stored telephone number at the callback time; and means responsive to the placing of the outgoing call, for automatically connecting the originating end of the outgoing call via the automatic call-distribution system to a station of the plurality of stations for handling of the outgoing call by an agent.

17. A method of automatically returning calls in an arrangement for automatically distributing incoming calls to a plurality of agents for answering and handling the incoming calls, the method comprising the steps of:

storing a telephone number relating to an incoming call from a caller;

automatically prompting the caller to indicate a callback time, in an absence of availability of an agent of the plurality of agents to answer the incoming call;

automatically placing an outgoing call having an originating end and a terminating end to the stored telephone number at the callback time, in response to receipt from the caller of an indication of the callback time; and automatically connecting the originating end of the outgoing call to an agent of the plurality of agents to handle the outgoing call, in response to the placing of the outgoing call.

18. The method of claim 17 wherein
the step of storing a telephone number comprises the steps of:

automatically prompting the caller to indicate a telephone number for callback, in the absence of availability of an agent of the plurality of agents to answer the incoming call; and automatically storing the received telephone number, in response to receipt from the caller of the telephone number for callback.

19. The method of claim 17 wherein
the step of storing a telephone number comprises the step of:

automatically storing the telephone number from which the call originated, in response to set-up of the incoming call.

20. The method of claim 17 further comprising
the step of
estimating a waiting time of an incoming call to be answered by an agent; and wherein
the step of prompting comprises the step of
automatically prompting the caller to indicate the callback time, in response to unavailability of an agent to answer the incoming call and an estimation that the call's waiting time will exceed a predetermined maximum.

21. The method of claim 20 further comprising the step of automatically prompting the caller to indicate whether the caller wishes to hold or to receive a return call, in response to the unavailability of an agent to answer the incoming call and the estimation that the call's waiting time will exceed the predetermined maximum; and wherein the step of automatically prompting the caller to indicate the callback time, in response to unavailability of an agent to answer the incoming call and an estimation that the call's waiting time will exceed a predetermined maximum, includes the step of automatically prompting the caller to indicate the callback time, in response to unavailability of an agent to answer the incoming call and an estimation that the call's waiting time will exceed a predetermined maximum and receipt from the caller of an indication that the caller wishes to receive a return call.

22. The method of claim 17 further comprising the step of automatically prompting the caller to indicate a callback time period; and wherein
the step of placing an outgoing call includes the step of periodically automatically placing the outgoing call again during the indicated callback time period, in response to the outgoing call failing to be answered at its terminating end, until either the outgoing call is answered at its terminating end or the callback time period expires.

23. The method of claim 17 wherein
the step of placing an outgoing call includes the steps of:

determining whether the caller is a member of a predetermined subset of all possible callers; and automatically placing the outgoing call, in response to both the receipt of the indication of the callback time and a determination that the caller is a member of the subset, or discarding the received indication without placing the outgoing call, in response to both the receipt of the indication of the callback time and a determination that the caller is not a member of the subset.

24. The method of claim 17 wherein
the step of placing an outgoing call includes the steps of:

automatically storing the callback time with the telephone number of the incoming call to schedule a return call to the telephone number at the callback time, in response to receipt from the caller of the indication of the callback time; and automatically retrieving the stored telephone number and automatically placing the return call to the retrieved telephone number, in response to the callback time becoming a present time.

25. The method of claim 17 wherein
the step of placing an outgoing call comprises the steps of automatically determining whether an agent is available to handle a return call to the stored telephone number and whether a communication link is available to carry the return call, in response to arrival of the callback time, automatically reserving an available agent and an available link, in response to a determination that an agent and a communication link are available, and automatically placing the outgoing call on the reserved link to the stored telephone number, in response to reservation of the agent and the link; and
the step of connecting comprises the step of
automatically connecting the originating end of the outgoing call to the reserved agent, in response to the placing of the outgoing call.

26. A method of automatically returning calls in an arrangement for automatically distributing incoming calls to a plurality of agents for answering and handling the incoming calls, the method comprising the steps of:

estimating a waiting time of an incoming call to be answered by an agent;

storing a telephone number relating to an incoming call, in response to the incoming call from a caller;

automatically prompting the caller to indicate whether the caller wishes to hold or to receive a return call, in an absence of availability of an agent to answer the incoming call and an estimation that the call's waiting time will exceed a predetermined maximum;

automatically prompting the caller to indicate a callback time and a callback time period, in response to receipt from the caller of an indication that the caller wishes to receive a return call;

automatically placing an outgoing call having an orignating end and a terminating end to the stored telephone number at an indicated callback time, in response to receipt from the caller of the indication of the callback time and the callback time peiod;

periodically automatically placing the outgoing call again during the indicated callback time period, in response to the outgoing call failing to be answered at its terminating end, until either the outgoing call is answered at its terminating end or the indicated callback time period expires; and automatically connecting the originating end of the outgoing call to an agent to handle the outgoing call, in response to the placing of the outgoing call.

27. The method of claim 26 wherein
the step of storing a telephone number comprises the steps of:
automatically prompting the caller to indicate a telephone number for callback, in an absence of availability of an agent of the plurality of agents to answer the incoming call; and
automatically storing a telephone number received from the caller for callback.

28. The method of claim 26 wherein
the step of storing a telephone number comprises the step of:
automatically storing the telephone number from which the call originated, in response to set-up of the incoming call.

29. The method of claim 26 wherein
the step of placing an outgoing call, in response to receipt from the caller of the indication of the callback time and the callback time period, includes the steps of:
determining whether the caller is a member of a predetermined subset of all possible callers; and
automatically placing the outgoing call, in response to both the receipt of the indication of the callback time and a determination that the caller is a member of the subset, or
discarding the received indication without placing the outgoing call, in response to both the receipt of the indication of the callback time and a determination that the caller is not a member of the subset.

30. The method of claim 26 wherein
each said step of placing an outgoing call comprises the steps of
automatically determining whether an agent is available to handle a return call to the stored telephone number and whether a communication link is available to carry the return call, in response to arrival of the callback time,
automatically reserving an available agent and an available link, in response to a determination that an agent and a communication link are available, and
automatically placing the outgoing call on the reserved link to the stored telephone number, in response to reservation of the agent and the link; and
the step of connecting comprises the step of
automatically connecting the originating end of the outgoing call to the reserved agent, in response to the placing of the outgoing call.

* * * * *